United States Patent [19]
Atkinson

[11] Patent Number: 5,845,595
[45] Date of Patent: Dec. 8, 1998

[54] AMPHIBIOUS VEHICLE HAVING ENDLESS CLEATED TRACKS WHICH ARE ADAPTABLE FOR A WATER MODE AND A LAND MODE

[76] Inventor: Jimmy Ray Atkinson, 2805 E. Park Ave., Houma, La. 70363-3745

[21] Appl. No.: 796,917

[22] Filed: Feb. 6, 1997

[51] Int. Cl.⁶ .................................................. B63B 35/00
[52] U.S. Cl. .............................................. 114/270; 440/95
[58] Field of Search ..................... 114/270; 440/95–97; 305/116, 107, 117, 127, 139, 129, 86, 153, 154

[56] References Cited

U.S. PATENT DOCUMENTS

| | | | |
|---|---|---|---|
| 849,882 | 4/1907 | Bartley | 305/117 |
| 1,654,632 | 1/1928 | Burke | 305/154 |
| 2,466,236 | 4/1949 | Hecker | 114/270 |
| 2,546,523 | 3/1951 | Reynolds | 114/270 |
| 3,842,785 | 10/1974 | Rivet | 114/270 |

*Primary Examiner*—Ed L. Swinehart
*Attorney, Agent, or Firm*—George A. Bode; Lisa D. Charouel; Bode & Associates

[57] ABSTRACT

An amphibious vehicle has a land mode and a water mode wherein in the land mode the front end and the rear end angles of inclination are reduced to minimize the damage to the landscape of the earth's terrain. The amphibious vehicle comprises first and second pontoons, each having a bottom curved surface wherein the bottom curved surface has a knuckle-like point for facilitating turning thereabout.

11 Claims, 5 Drawing Sheets

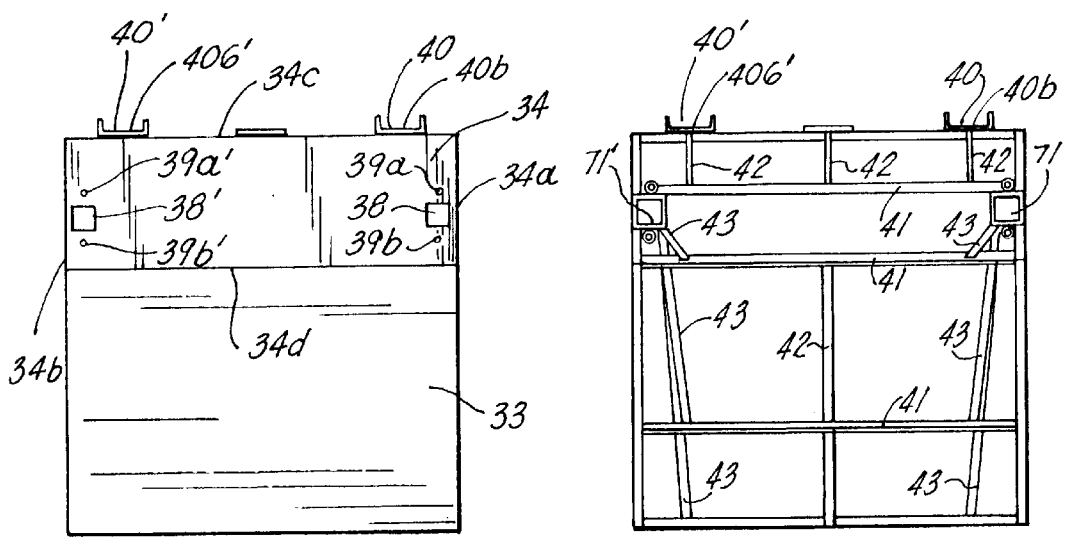
FIG. 3
FIG. 4
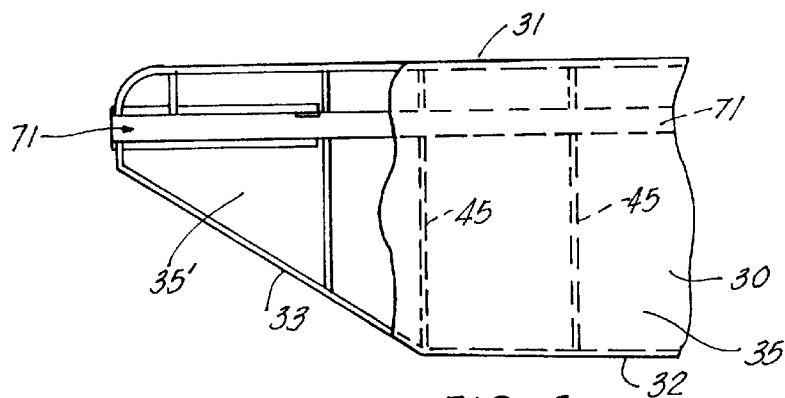
FIG. 5
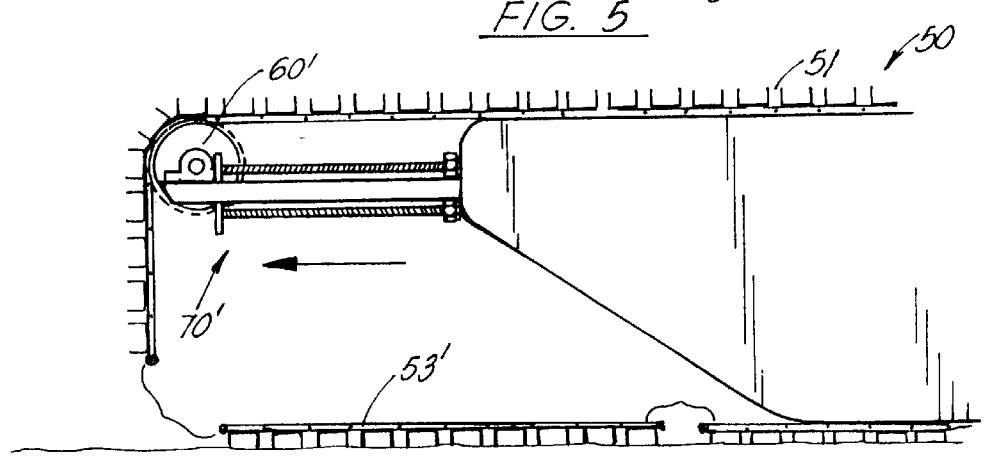
FIG. 6

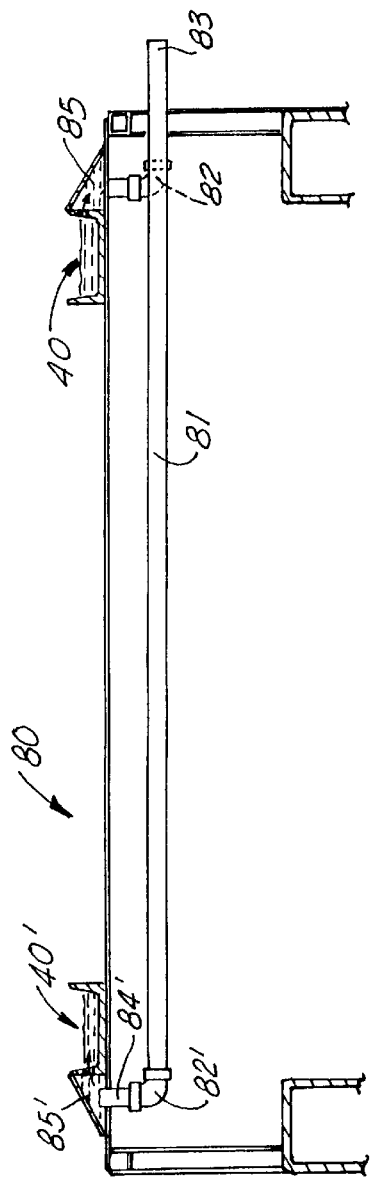
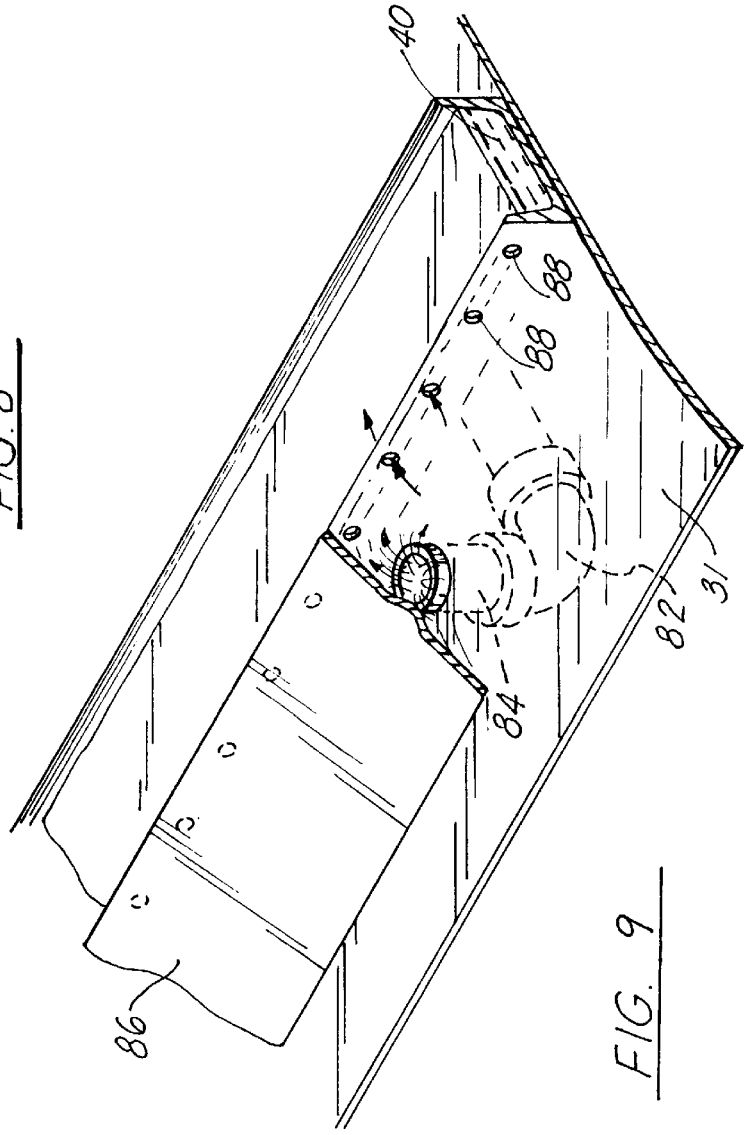

AMPHIBIOUS VEHICLE HAVING ENDLESS CLEATED TRACKS WHICH ARE ADAPTABLE FOR A WATER MODE AND A LAND MODE

BACKGROUND OF THE INVENTION

1. Field of the Invention

The present invention relates to an amphibious vehicle for use in a marsh-like or swamp-like medium and on a land medium and, more particularly, to an amphibious vehicle having two parallel pontoons each of which is provided with a pivot surface having a knuckle-like point for turning the amphibious vehicle thereabout more easily. Moreover, during a land mode, the front end and the rear end of moveable endless cleated tracks are extended wherein the extended portions have a reduced angle of inclination with respect the earth's terrain and flex to the earth's contour. Therefore, damage to the landscape of the earth's terrain is significantly minimized. Additionally, the chain/roller links of the moveable endless cleated tracks are continuously lubricated thereby providing for a smoother mechanical operation thereof.

2. General Background

Typically, amphibious vehicles are provided with two parallel moveable endless cleated tracks for providing traction in the marsh-like or swamp-like mediums and on the land medium. Some, such as, U.S. Pat. No. 2,894,476, by Lindgren; U.S. Pat. No. 3,418,961, by Gregg; U.S. Pat. No. 3,842,785, by Rivet; U.S. Pat. No. 3,951,093, by Poche; U.S. Pat. No. 4,124,124, by Rivet; U.S. Pat. No. 4,433,634, by Coast; U.S. Pat. No. 4,846,092, by Wilson; and U.S. Pat. No. 4,961,395, by Coast use such endless cleated tracks. However, the endless cleated tracks often cause significant damage to the landscape of the earth's terrain as the known amphibious vehicles move or maneuver on land. Often, construction companies, utility companies and/or oil companies must repair the damage to the landscape if private property or an easement is damaged, which can be costly.

The pontoons of the known amphibious vehicles, typically, have a flat or a rocker-like bottom surface having the center-of-gravity distributed to the flat surface or a portion of the rocker-like bottom surface. Since the center-of-gravity is substantially distributed about the flat surface or the portion of the rocker-like surface, as the amphibious vehicle turns the landscape is damaged.

The chain/roller links of the endless cleated tracks, because submerged for long periods of time in water, become rusted thereby prohibiting a smooth mechanical operation of the endless cleated tracks. The rusted chain/roller links provide for a rough and choppy propulsion of the amphibious vehicle. Therefore, such links must be replaced frequently. Henceforth, several attempts to lubricate the chain/roller links have been made.

SUMMARY OF THE PRESENT INVENTION

The preferred embodiment of the apparatus of the present invention solves the aforementioned problems in a straight forward and simple manner. What is provided is an amphibious vehicle having two parallel pontoons each of which are provided with a pivot surface having a knuckle-like point for turning the amphibious vehicle thereabout more easily. Moreover, during a land mode, the front end and the rear end of moveable endless cleated tracks are extended wherein the extended portions have a reduced angle of inclination with respect the earth's terrain and flex to the earth's contour. Therefore, damage to the landscape of the earth's terrain is significantly minimized. Additionally, the chain/roller links of the moveable endless cleated tracks are continuously lubricated thereby providing for a smoother mechanical operation thereof.

In operation the amphibious vehicle comprises:

(a) first and second elongated means for floating each having a bottom curved surface wherein the bottom curved surface has a knuckle-like point for facilitating turning thereabout;

(b) first and second endless cleated tracks encompassing a top surface and the bottom curved surface of said first and second elongated floating means, respectively; and, (c) a platform coupled to said first and second elongated floating means.

In view of the above, it is an object of the present invention to provide an amphibious vehicle which significantly minimizes damage to the landscape of the earth's terrain by reducing the front end and rear end angles of inclination between such landscape and two parallel endless cleated tracks.

It is a further object of the present invention to provide such an amphibious vehicle which has two parallel endless cleated tracks which function in a land mode and a water mode wherein in the land mode, front end and rear end cleated track portions are added to each of the two parallel endless cleated tracks. The front end and rear end cleated track portions are capable of flexing to the contour of the landscape thereby further minimizing damage to the landscape.

It is a still further object of the invention to provide an amphibious vehicle having a lubricating injection system for lubricating two parallel chain/roller mechanisms of each of the two endless cleated tracks thereby facilitating a smooth mechanical operation thereof.

It is a still further object of the invention to provide the bottom surface of each pontoon with a pivot surface having a knuckle-like point wherein the knuckle-like point is substantially the center-of-gravity. Therefore, as the amphibious vehicle turns about said knuckle-like point, the amphibious vehicle turns more easily and damage to the landscape is further minimized.

It is a further object of the present invention to provide a means for stepping formed in a side wall of each pontoon thereby enabling an operator to climb aboard the platform.

The above objects and other features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 3 illustrates an end view of the pontoon of FIG. 1;

FIG. 4 illustrates an interior detail view of the end view of the pontoon of FIG. 5;

FIG. 5 illustrates a detailed side view of the extended sprocket (coupled to the rear end of the pontoon) for adapting the endless cheated track for use on land of FIG. 2;

FIG. 6 illustrates a cut-away side view of the rear end of the pontoon of FIG. 1;

FIG. 8 illustrates an end view of the lubrication injection system for use in the present invention; and, FIG. 9 illustrates a detailed view of the lubrication reservoir and of FIG. 8.

DETAILED DESCRIPTION OF THE PREFERRED EMBODIMENT

In general, an amphibious vehicle comprises a platform coupled above two identical spaced apart pontoons (elongated floating means) each having coupled to the bottom surface and top surface thereof endless cleated tracks. The endless cleated tracks couple to a prime mover via sprocket wheels having traverse shafts coupled to such prime mover, for the propulsion of the amphibious vehicle. Such examples of amphibious vehicles are described in U.S. Pat. Nos. 4,124,124, 4,846,092, and 3,842,785.

Figure 1:
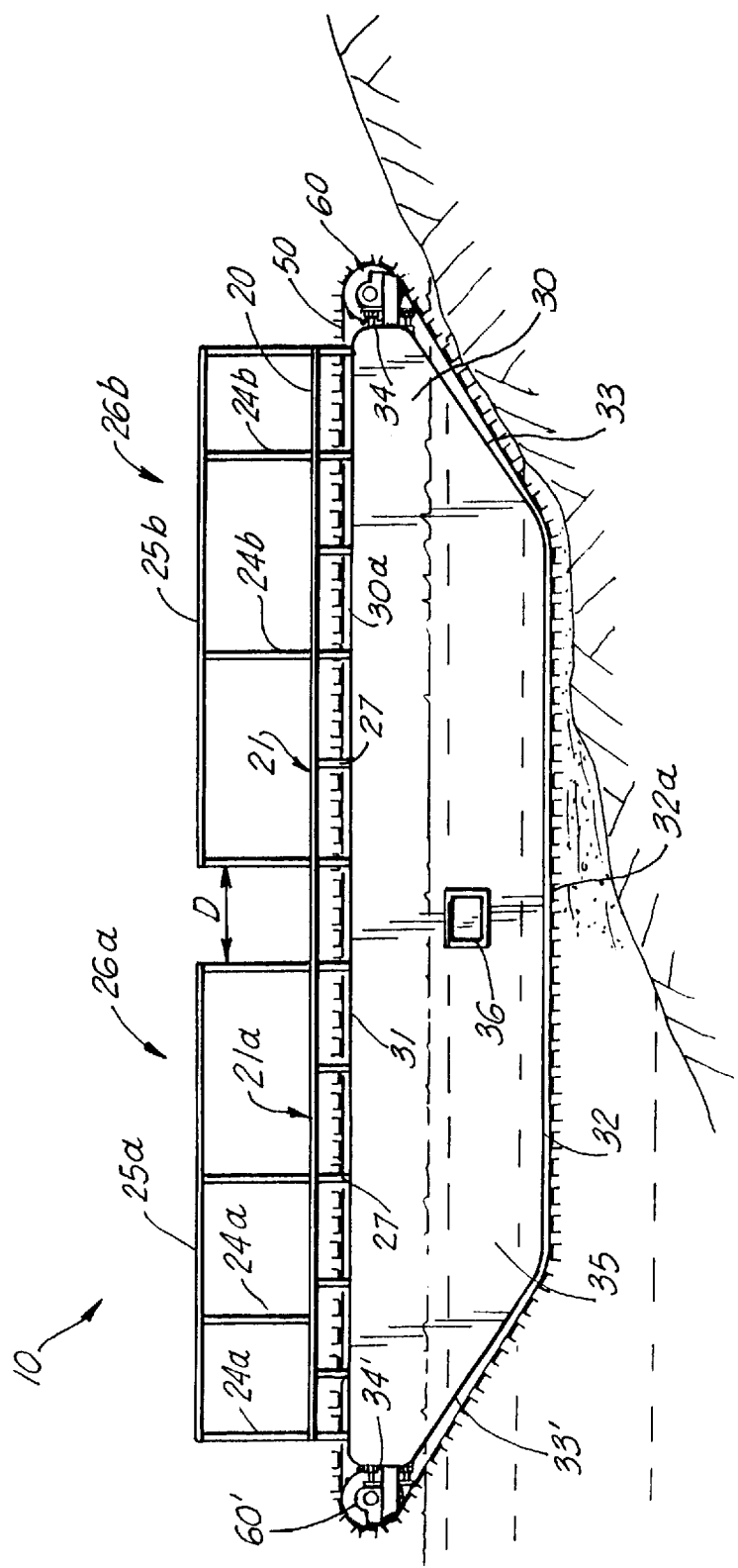
FIG. 1 illustrates a side view of the amphibious vehicle, shown partially submerged in a waterway and approaching land, of the present invention.
Figure 2:
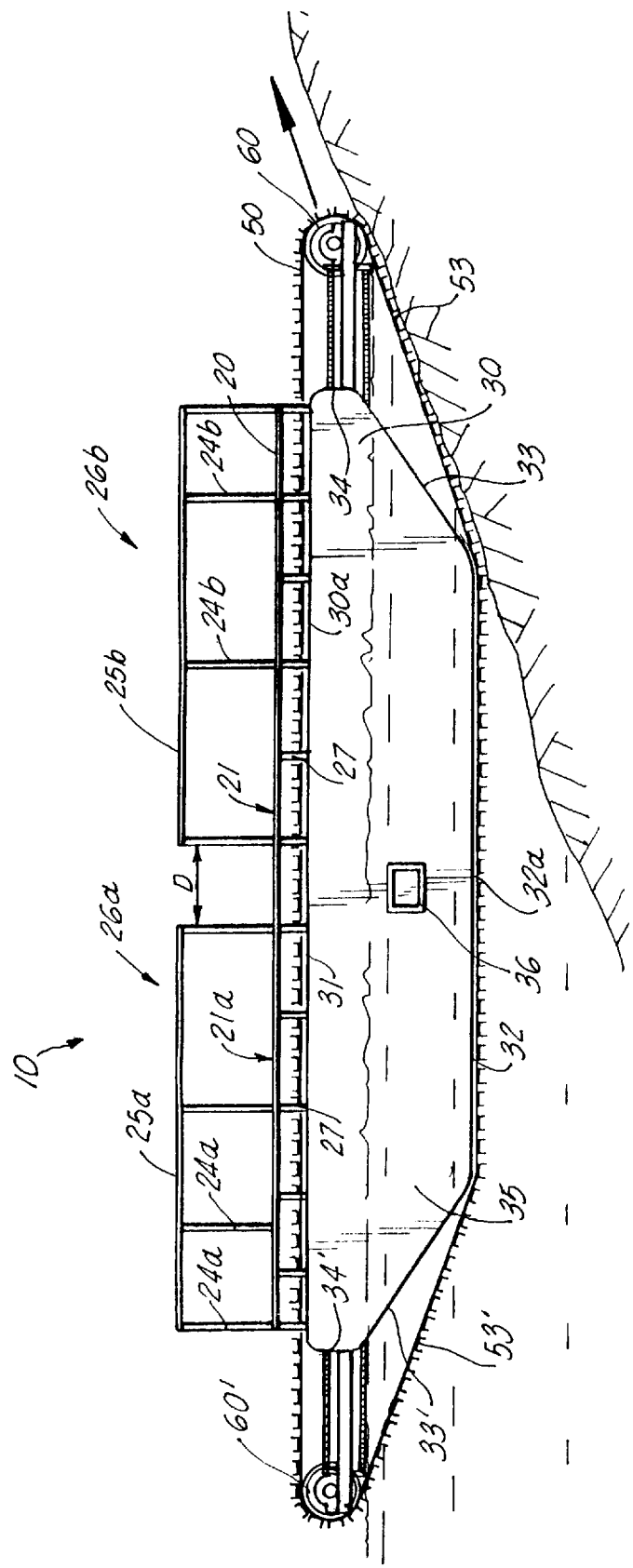
FIG. 2 illustrates a side view of the amphibious vehicle with the endless cheated track adapted for use on land of the present invention.

Referring now to the drawing, and in particular FIGS. 1 and 2, the amphibious vehicle of the present invention is designated generally by the numeral 10 wherein the embodiment of FIG. 1 illustrates amphibious vehicle 10 in the water mode and the embodiment of FIG. 2 illustrates amphibious vehicle 10 in the land mode. Amphibious vehicle 10 is generally comprised of platform 20, first and second spaced apart pontoons (only the first pontoon 30 shown), first and second parallel adaptable endless cleated tracks (only the first parallel adaptable endless cleated track 50 shown), front end and rear end sprocket wheels 60 and 60' and their parallel counterparts (not shown), sprocket wheel support systems 70 and 70' and their parallel counterparts (not shown) and lubrication injection systems (only 80 shown in FIG. 8).

Since each of the first and second pontoons and the first and second parallel adaptable endless cleated tracks are substantially identical, only one such pontoon and associated adaptable endless cleated track will be described in detail. Moreover, the front end and the rear end of each of the first and second pontoons are substantially identical. Henceforth, only the rear end of such first pontoon 30 will be described in detail.

Platform 20 comprises a flat surface 21 having coupled to a top surface thereof, in close proximity to platform edge 21a, a first set and a second set of a plurality of vertical bars 24a and 24b. Coupled to the first set and the second set of the plurality of spaced vertical bars 24a and 24b are first and second horizontal bars 25a and 25b, respectively, thereby forming first and second barricades 26a and 26b for preventing individuals moving about on platform 20 from falling overboard. First and second barricades 26a and 26b are spaced from each other by distance "D" for providing an entry point onto platform 20 from the side of amphibious vehicle 10. Likewise, the opposing platform edge parallel to platform edge 21a comprises substantially identical first and second barricades (NOT SHOWN) which are spaced from each other by a distance for providing another entry point onto platform 20. Nevertheless, platform edges perpendicular to platform edge 21a may be equipped with barricades and entry points. However, for transporting an automobile via amphibious vehicle 10, the barricades perpendicular to barricades 26a and 26b may be removable or pivotable for allowing such automobile entry onto platform 20.

Platform 20, on a bottom surface of platform edge 21a, comprises a plurality of spaced vertical support members 27 which are coupled in close proximity to outer pontoon edge 30a of first pontoon 30. Likewise, said opposing platform edge 21a has coupled thereto a plurality of spaced vertical support members (not shown) which are coupled in close proximity to an outer pontoon edge, parallel to outer pontoon edge 30a, of the second pontoon. The plurality of spaced vertical support members 27 and the identical plurality of spaced vertical support members function to support platform 20 above first and second pontoons (only first pontoon 30 shown).

In the exemplary embodiment, platform 20 is approximately 13 feet wide and 26 feet long but not limited thereto.

First pontoon 30, an elongated floating means, comprises a generally, air tight closed wall structure shaped in the form of a truncated pyramid defined by first horizontal wall 31, second horizontal wall 32 (which is shorter than first horizontal wall 31), first and second angled walls 33 and 33' and first and second vertical surfaces 34 and 34'. Second horizontal wall 32 is slightly curved, as shown, for providing a pivot surface having a centrally located knuckle-like point 32a wherein knuckle-like point 32a is the center-of-gravity of first pontoon 30. Henceforth, knuckle-like point 32a enables amphibious vehicle 10 to turn thereabout more easily. Since the amphibious vehicle 10 is able to turn more easily about knuckle-like point 32a damage to the landscape is minimized.

Each distal end of second horizontal wall 32 is coupled to first and second angled walls 33 and 33', respectively. First and second angled walls 33 and 33', respectively, couple to a respective distal end of first horizontal wall 31 via first and second vertical surfaces 34 and 34', respectively. The longitudinal edges of first horizontal wall 31 second horizontal wall 32 and edges of first and second angled walls 33 and 33' and first and second vertical walls 34 and 34' have unitarily coupled thereto perpendicularly first vertical wall 35 and second parallel vertical wall 35' (FIG. 5) thereby enclosing first pontoon 30. First vertical wall 35 differs from second parallel vertical wall 35' only in that first vertical wall 35 has recess 36 formed therein. Recess 36 has formed therearound in the interior of pontoon 30 a housing such that first pontoon 30 is maintained air tight. Recess 36 and such housing provide a step means wherein an individual may climb onto platform 20 from either the water or land via said step means.

First vertical wall 34 is located in the front end of first pontoon 30 and second vertical wall 34', identical to first wall, is located in the rear end of first pontoon 30. Since first vertical wall 34 is identical to second vertical wall 34, only one such vertical wall will be described in detail.

Referring to FIGS. 3 and 4, first vertical wall 34 is a rectangularly shaped wall having sides 34a, 34b, 34c and 34d wherein sides 34c and 34d define the width of first pontoon 30. First vertical wall 34 has formed therein first bar aperture 38, second bar aperture 38', a first pair of threaded apertures 39a and 39b positioned immediately above and immediately below first bar aperture 38, respectively, and a second pair of threaded apertures 39a' and 39b' positioned immediately above and immediately below second bar aperture 38', respectively. First aperture 38 and second aperture 38' are in close proximity to sides 34a and 34b, respectively. Side 34d has unitarily coupled thereto first angled wall 33. Side 34c is curved to unitarily couple to first horizontal wall 31, as shown in FIG. 5. Coupled to the first horizontal wall 31 are first and second parallel chain/roller channels 40 and 40' which are offset from the center of first and second apertures 38 and 38', respectively.

As shown in FIG. 4, first vertical wall 34 and first angled wall 33 have coupled in the interior of the compartment formed therefrom a truss network comprising a plurality of vertical support bars 41, a plurality of horizontal support bars 42 and a plurality of angled support bars 43 coupled together to support and stabilize first and second parallel channel bar guides 71 and 71', aligned with first and second bar apertures 38 and 38', respectively.

Referring to FIG. 5, first horizontal wall 31 and second horizontal wall 32 have coupled thereto a plurality of vertical support walls 45 for supporting and maintaining first horizontal wall 31 above second horizontal wall 32 wherein the plurality of vertical support walls 45 function as bulkheads. The bulkheads support first and second parallel channel bar guides 71 and 71' (only 71 shown) in the interior of first pontoon 30. The use of bulkheads to compartmentalize the pontoon is well known in the art. Furthermore, the bulkheads and said truss network prevents bending, buckling, twisting or cracking of the welded junctions of first pontoon 30.

Since first and second parallel adaptable endless cleated tracks (only first parallel adaptable endless cleated track 50 shown) are identical, only one such adaptable endless cleated track system will be described in detail. First parallel adaptable endless cleated track 50 is generally comprised of a plurality of track cleats 51, and two parallel endless chain/roller mechanisms (not shown) coupled to a bottom surface of the plurality of track cleats 51 for facilitating the continuous movement of endless cleated track system 50 in chain/roller channels 40 and 40', respectively. Each parallel endless chain/roller mechanism comprises a plurality of chain/roller members linked together and coupled to front end parallel sprocket wheel 70 and its parallel counterpart (not shown) and rear end parallel sprocket wheel 70' and its parallel counterpart (not shown). Such chain/roller mechanisms are well known in the art and are described in U.S. Pat. No. 4,846,092. The two parallel endless chain/roller mechanisms are positioned in chain/roller channels 40 and 40', respectively and the roller members of each parallel endless chain/roller mechanisms roll along surfaces 40b and 40b' (FIG. 3) of chain/roll channels 40 and 40', respectively.

In order to facilitate movement of the roller members during their continuous movement in channel 40 and 40', each of first and second pontoons (only 30 shown) is equipped with a lubricating injection system 80. Only lubricating injection system 80 in relation to first pontoon 30 will be described in detail.

Referring now to FIGS. 8 and 9, lubricating injection system 80 is positioned substantially in the center of first pontoon 30 between the front end and rear end thereof along a center bulkhead. Lubricating injection system 80 comprises lubrication distribution piping 81 extending from first and second lubrication reservoirs 85 and 85' positioned adjacent chain/roller channels 40 and 40', respectively and a plurality of injection apertures 88. Lubrication distribution piping 81 extends from first reservoir 85 to second reservoir 85' for distributing a lubricating fluid thereto from a source of lubricating fluid (not shown) via inlet port 83. Lubrication distribution piping 81 couples to first and second lubrication reservoirs 85 and 85' via first and second inlet connectors 82 and 82', respectively. In the exemplary embodiment, first and second inlet connectors 82 and 82' are elbow connectors coupled to first and second piping members 84 ad 84', respectively.

Since first and second lubrication reservoirs 85 and 85' are identical, only one such lubrication reservoir will be described in detail. Lubrication reservoir 85 comprises a slanted plate member 86 fixedly coupled to an upper edge of wall 40a of chain/roller channel 40 and the top surface of first horizontal wall 31. Wall 40a of chain/roller channel 40 has formed therein the plurality of injection apertures 88. As the lubricating fluid is filled in lubrication reservoir 85, the lubricating fluid is injected into chain/roller channel 40 thereby lubricating the chain/roller mechanisms rolling therea long. Lubricating the chain/roller mechanisms of first and second endless cleated tracks (only 30 shown) enhances the mechanical operation thereof.

Referring to FIGS. 2 and 6, first and second parallel adaptable endless cleated tracks (only first parallel adaptable endless cleated track 50 shown) function in a land mode and a water mode wherein in the land mode each of first and second parallel adaptable endless cleated tracks (only 50 shown) is adaptable to couple thereto extension cleated track members 53 (FIG. 2) and 53' wherein the extension cleated track members 53 and 53' reduce the front end and rear end angle of inclinations, respectively, of first and second parallel adaptable endless cleated tracks (only 50 shown). Moreover, the extension cleated track members 53 and 53' flexibly engage the landscape of the earth's terrain since the chain/roller mechanisms do not immediately abut the fixed surfaces of first and second angled walls 33 and 33' of first and second pontoons (only 30 shown). Henceforth, extension cleated track members 53 and 53' are capable of flexing to the contour of such landscape. As a result, as the amphibious vehicle moves on land, damage to such landscape is minimized as the extension cleated track members flex to said contour. Additionally, knuckle-like point 32a minimizes damage to the landscape when turning amphibious vehicle 10 thereabout.

Figure 7:
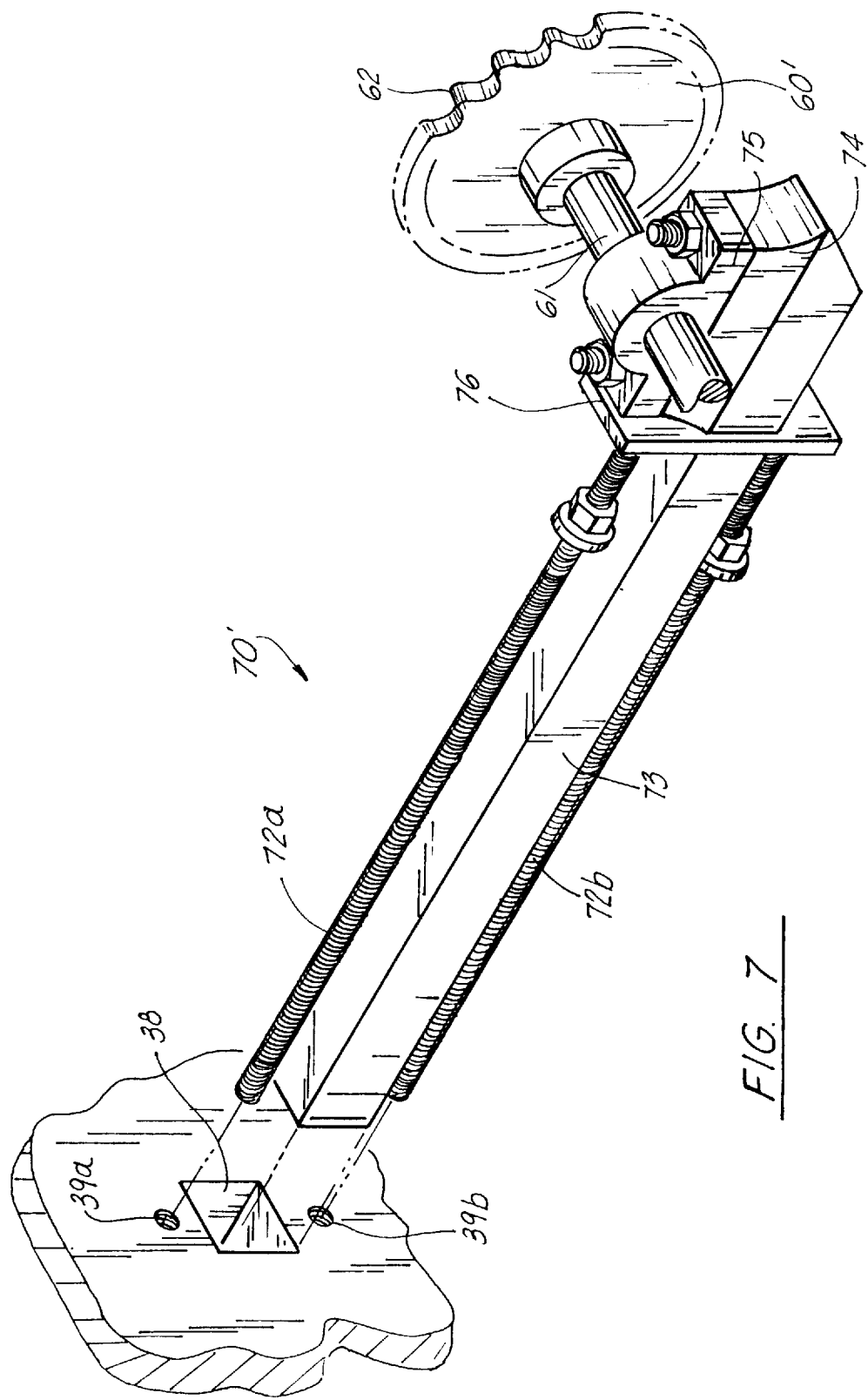
FIG. 7 illustrates an exploded view of the sprocket and the sprocket support system of FIG. 1.

In operation, in the land mode, an operator of amphibious vehicle 10 climbs down from platform 20 via said step means and proceeds to couple extension cleated track members 53 and 53' to the front end and the rear end, respectively, of each of the first and second pontoons (only 30 shown). In doing so, front end sprocket wheel 60 and its parallel counterparts are extended via sprocket support system 70 and its parallel counterpart, respectively, as best illustrated in FIG. 7, a distance from the front end of amphibious vehicle 10. As a result, the front end angles of inclination of first and second endless cleated tracks (only 50 shown) are reduced in the land mode. The operator should then evaluate the water level in the rear end of amphibious vehicle 10 to determine if the water level is low. A low water level means that an operator can stand in the water without being hindered to extend the sprocket support systems in the rear end. Since sprocket support systems 70 and 70' and their parallel counterparts are identical, only one such sprocket support system will be described in detail.

Referring to FIG. 7, sprocket support system 70' comprises two parallel threaded rod members 72a and 72b, sliding support block 73, mounting block 74, bearing housing 75, and support plate 76. Threaded rod members 72a and 72b and sliding support block 73 are coupled perpendicularly to support plate 76 wherein in the water mode support plate is slid to block aperture 38. In the land mode, threaded rod members 72a and 72b are extended from threaded apertures 39a and 39b for extending threaded rod members from the water mode to the land mode. As threaded rod members 72a and 72b are extended, simultaneously, sliding support block 73 is extended accordingly. Threaded rod members 72a and 72b are secured in their land mode position via nuts 77a and 77b. Sliding support block 73 has coupled thereto sprocket wheel 60. Sprocket wheel 60 comprises traverse shaft 61 journaled through bearing housing 75. Sprocket wheel 60 couples to a prime mover (not shown) for rotating sprocket wheel 60. Sprocket wheel 60 has formed therein a plurality of teeth 62 which coupled to chain/roller mechanisms.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An amphibious vehicle comprising:
   (a) first and second pontoons;
   (b) first and second endless cleated track systems encompassing a top surface and a bottom surface of said first and second pontoons, respectively;
   (c) a platform coupled to said first and second pontoons; and,
   (d) first and second lubricating injection systems for distributing a lubricating fluid into first and second parallel chain/roller channels of said first pontoon and first and second parallel chain/roller channels of said second pontoon, each of said first and second lubricating injection systems comprises:
      (i) a first reservoir having a plurality of injection apertures formed in a wall of each of said first parallel chain/roller channel of said first and second pontoons,
      (ii) a second reservoir having a plurality of injection apertures formed in said wall of each of said second parallel chain/roller channel of said first and second pontoon, and,
      (iii) a distribution pipe coupled to said first reservoir and said second reservoir of each said first and second pontoon for transporting the lubricating fluid thereto.

2. The amphibious vehicle of claim 1, further comprising a parallel set of sprocket wheel support systems for supporting sprocket wheels coupled to the front end of each of said first pontoon and said second pontoon and a parallel set of sprocket wheel support systems for supporting sprocket wheels coupled to the rear end of each of said first pontoon and said second pontoon wherein each sprocket wheel support system has a land mode position and a water mode position wherein said land mode position is an extended position forming reduced front end and rear end angles of inclination of each of said first and second endless cleated tracks.

3. The amphibious vehicle of claim 2, wherein said each sprocket support system comprises:
   (a) two parallel threaded rod members;
   (b) a sliding support block;
   (c) a mounting block coupled to said sliding support block;
   (d) a bearing housing coupled to said mounting block; and,
   (e) a support plate having coupled thereto perpendicularly said two parallel threaded rod members and said sliding support block.

4. The amphibious vehicle of claim 1, further comprising a step formed in a side wall of each of the first and second elongated floating means.

5. An amphibious vehicle comprising:
   (a) first and second pontoons;
   (b) first and second endless cleated track systems encompassing a top surface an a bottom surface of said first and second pontoons, respectively;
   (c) a platform coupled to said first and second pontoons; and,
   (d) a parallel set of sprocket wheel support systems for supporting sprocket wheels coupled to the front end of each of said first pontoon and said second pontoon and a parallel set of sprocket wheel support systems for supporting sprocket wheels coupled to the rear end of each of said first pontoon and said second pontoon wherein each sprocket wheel support system has a land mode position and a water mode position wherein said land mode position is an extended position forming reduced front end and rear end angles of inclination of each of said first and second endless cleated tracks having coupled thereto extension cleated track members.

6. The amphibious vehicle of claim 5, further comprises first and second lubricating injection systems for distributing a lubricating fluid into first and second parallel chain/roller channels of said first pontoon and first and second parallel chain/roller channels of said second pontoon.

7. The amphibious vehicle of claim 6, wherein each of said first and second lubricating injection systems comprises:
   (a) a first reservoir having a plurality of injection apertures formed in a wall of each of said first parallel chain/roller channels of said first and second pontoons;
   (b) a second reservoir having a plurality of injection apertures formed in said wall of each of said second parallel chain/roller channels of said first and second pontoon; and,
   (c) a distribution pipe coupled to said first reservoir and said second reservoir of each said first and second pontoon for transporting the lubricating fluid thereto.

8. The amphibious vehicle of claim 5, wherein said each sprocket support system comprises:
   (a) two parallel threaded rod members;
   (b) a sliding support block;
   (c) a mounting block coupled to said sliding support block;
   (d) a bearing housing coupled to said mounting block; and,
   (e) a support plate having coupled thereto perpendicularly said two parallel threaded rod members and said sliding support block.

9. The amphibious vehicle of claim 5, further comprising a step formed in a side wall of each of the first and second elongated floating means.

10. A method for minimizing damage to the landscape as an amphibious vehicle moves and maneuvers on land, said method comprising the steps of:
    in the land mode
    (a) an operator climbs off a platform of the amphibious vehicle via a step formed in either of a first or second elongated means for floating;
    (b) extending a first set of threaded rod members in the front end of the first elongated floating means;
    (c) extending a first sprocket wheel coupled to said threaded rod members;
    (d) extending a second set of threaded rod members parallel to said first set of threaded rod members;

(e) extending a second sprocket wheel;

(f) adding an extension cleated track member to an endless cleated track system;

(g) repeating steps (a)–(f) for said second elongated floating means parallel to said first elongated floating means.

11. The method of claim 10, further comprising the steps of:

(h) evaluating the water level of the water medium;

if the water level is low then (i) repeating steps (a)–(f) for the rear end of the first elongated floating means;

(j) repeating steps (a)–(f) for the rear end of the second elongated floating means.

\* \* \* \* \*